June 13, 1939.  J. S. PARSONS  2,162,516

AUTOMATIC NETWORK PROTECTOR

Filed Feb. 27, 1937  2 Sheets-Sheet 1

WITNESSES:
C. J. Weller.
G. O. Harrison

INVENTOR
John S. Parsons.
BY
ATTORNEY

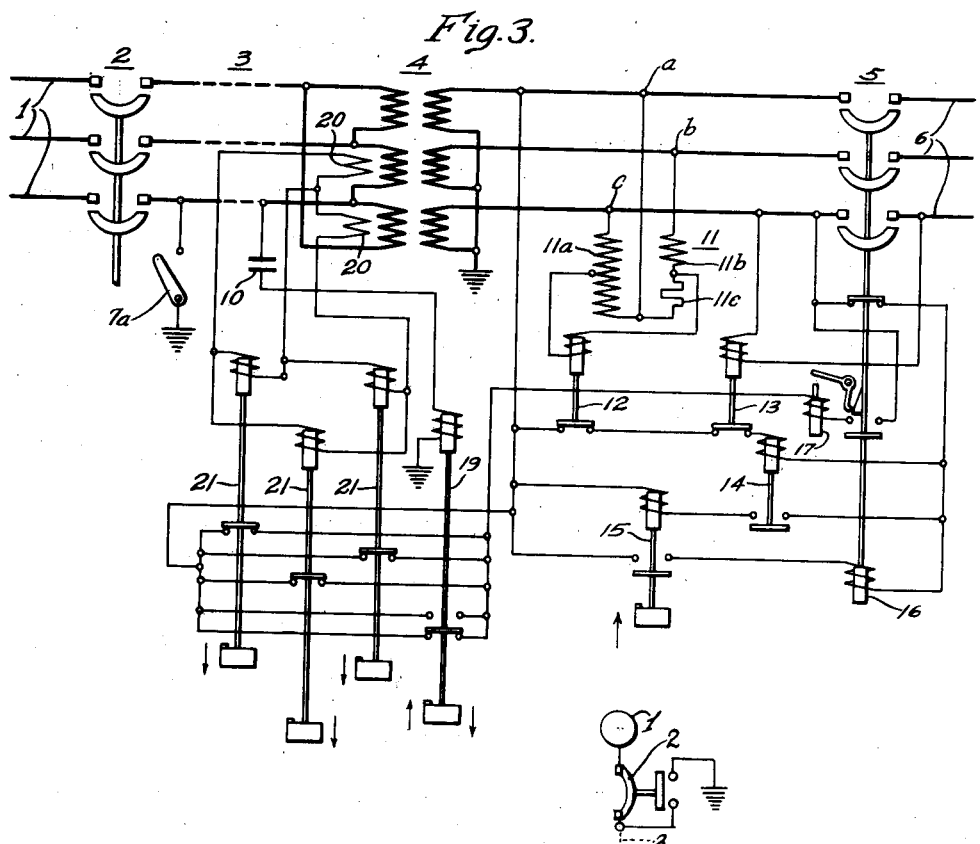

Patented June 13, 1939

2,162,516

UNITED STATES PATENT OFFICE 2,162,516

AUTOMATIC NETWORK PROTECTOR

John S. Parsons, Swissvale, Pa., assignor to Westinghouse Electric & Manufacturing Company, East Pittsburgh, Pa., a corporation of Pennsylvania Application February 27, 1937, Serial No. 128,203

10 Claims. (Cl. 175—294)

My invention relates to control apparatus for alternating-current systems of transmission and distribution, and particularly to such apparatus for synchronizing polyphase alternating-current circuits. In its more specific aspects, my invention relates to the control equipment for the network circuit breakers used in network systems of distribution for controlling the connection of the step-down network transformers to the network load circuit.

In the low voltage alternating-current network system as used extensively for metropolitan distribution, a common network load circuit energized at a voltage suitable for domestic distribution, such as 208 volts phase-to-phase, is supplied by means of a number of distribution feeders commonly energized at voltages of the order of 4000 to 27,000 volts, by means of a number of banks of step-down network transformers. The secondary leads of the banks of network transformers are controlled by automatic circuit breakers commonly known as network protectors. The control apparatus for the circuit breakers of such network protectors usually includes a polyphase power directional relay which operates in the event of a fault on the associated feeder to trip the network circuit breaker, and which operates to reclose the network circuit breaker when the relationship of feeder and network voltages is such that power will flow from the feeder to the network load circuit immediately following the reclosure. The connections for such power directional relays are rather elaborate, and it is an object of the present invention to provide a simplified network protector which will utilize simplified phasing apparatus.

A further object of the invention is to provide a simplified synchronizing device of general application to polyphase circuits.

Another object of my invention is to provide a novel simplified automatic network protector in which the apparatus for tripping the network circuit breaker, as well as the apparatus for reclosing the breaker, may be contained in the same housing with the breaker itself.

A further object of my invention is to provide a novel network system of distribution in which the connection of the network transformers to the network is controlled by means of phasing apparatus comprising a device responsive to reversed sequence of transformer secondary phase voltages, such as a negative sequence voltage relay, and a device responsive to excess voltage between a transformer secondary conductor and a network conductor of corresponding phase. My present invention, however, contemplates the use of such phasing apparatus for the control of network circuit breakers individually; a complete, separate phasing equipment being provided for each network circuit breaker. I do not claim herein the application of such phasing apparatus to alternating-current networks generally, nor to the control of group phasing equipment, as this subject-matter is claimed in the copending joint application of myself and George O. Harrison, Serial No. 128,204, filed February 27, 1937, and assigned to Westinghouse Electric & Manufacturing Company, which has matured into Patent No. 2,121,608.

Other objects of my invention will become evident from the following detailed description taken in conjunction with the accompanying drawings, in which:

Fig. 3 is a diagrammatic view similar to Figs. 1 and 2 of a further modification of the invention, and Fig. 4 is a diagrammatic view of a network system embodying my invention.

Figure 1:
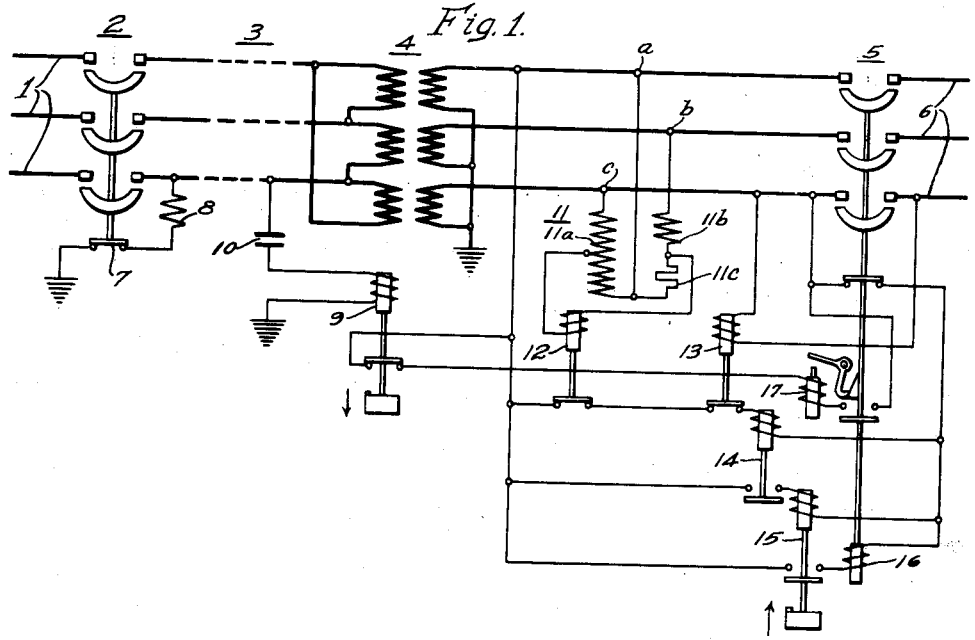
Figure 1 is a diagrammatic view of an automatic network protector embodying my invention, together with its associated transformer bank and the feeder and associated feeder breaker which connects the transformer bank to the generating station or substation supply bus.

Referring to Fig. 1 in detail, a three-phase alternating-current supply circuit 1, which may be a generating station or sub-station bus, is connected by means of a feeder circuit breaker 2 to a three-phase feeder 3. A number of banks of step-down transformers, of which one is shown at 4, is connected between the feeder 3 and the network load circuit 6. A number of similar banks of transformers is shown by single-line representation in Fig. 4.

The transformers 4 are preferably connected in delta on the high tension side, and in star with neutral grounded on the low voltage or network side. The secondary or low voltage leads of the transformer banks are controlled by network circuit breakers individual to the banks of transformers, one such network circuit breaker being shown at 5.

The feeder breaker 2 is provided with an automatic grounding switch 7, shown for simplicity as simple auxiliary contacts of the circuit breaker 2, arranged to ground one phase of the feeder 3 upon opening of the circuit breaker 2. It will be understood that in a practical embodiment of the invention, a more complicated form of grounding switch 7 would be provided. An impedance 8 may be included in series with the grounding switch 7 for the purpose of limiting the short circuit current which may flow in the event that a ground exists on one of the remaining phases of the feeder 3 when the feeder circuit breaker 2 opens. For the majority of applications, the short circuit current flowing under such conditions would be unobjectionable, and the impedance 8 could be omitted.

The feeder circuit breaker 2 is provided with the usual relays or other protective apparatus (not shown) for causing the feeder breaker to open within a comparatively short time interval, such as a fraction of a second, in response to any phase-to-ground or phase-to-phase fault on the feeder 3. An under-voltage relay 9 is connected to the incoming high voltage lead of the transformer bank 4, on the phase with which the grounding switch 7 is associated, by any suitable coupling device, such as a capacitor 10. The under-voltage relay 9 serves to effect the opening of the network circuit breaker 5 whenever the feeder breaker 2 is opened.

The under-voltage relay 9 is preferably designed to drop-out and close its contacts at a voltage of the order of 80% of the normal line-to-ground voltage of the feeder 3, and to open its contacts at a voltage of the order of 20% to 30% of the normal line-to-ground voltage. The relay 9 is also preferably designed to introduce a time delay of the order of .5 to 1 second in closing its contacts, in order to permit opening of the feeder breaker 2 before closure of the under-voltage relay 9, in the event of a ground fault on a different feeder (not shown). Although shown as an electromagnetic type relay provided with a dashpot, the relay 9 may be of any suitable design having the desired characteristics, such as an electrostatic relay.

A negative sequence voltage filter 11 is connected on the low voltage side of the transformer bank 4 for energizing a negative sequence voltage relay 12 in the event that any two phases of the secondary voltage of the transformer bank 4 are transposed.

The negative sequence voltage filter 11 comprises an auto-transformer 11a having a 40% tap, a reactor 11b and a resistor 11c. The reactor 11b and resistor 11c are designed to have a combined lagging phase angle of 60°, and the resistance of the resistor 11c is so related to the total impedance of the reactor 11b and resistor 11c, that the voltage drop across the resistor 11c is equal to 40% of the total voltage impressed upon the reactor 11b and the resistor 11c in series. With the constants of the phase sequence filter 11 designed as indicated, and the terminals of the filter connected to the phase conductors in the order indicated by the reference characters $a$, $b$ and $c$, the voltage appearing between the tap of the autotransformer 11 and the junction of the reactor 11b and the resistor 11c, is proportional to the negative symmetrical components of the polyphase voltage applied to the filter terminals, as explained in the U. S. patent to B. E. Lenehan, No. 1,936,797, granted November 28, 1933, and assigned to the Westinghouse Electric & Manufacturing Company.

The negative sequence voltage relay 12 is designed to open its contacts when the negative sequence voltage impressed upon the terminal of the phase sequence filter 11 equals or exceeds a value of the order of 25% of the normal positive sequence secondary voltage of the transformer bank 4. The under-voltage relay 12 drops out at some lower value of negative sequence voltage, such as 15% of the normal secondary positive sequence voltage of the transformer bank 4.

A voltage responsive relay 13 is provided for preventing the closure of the network circuit breaker 5 in the event that all three phases of secondary voltage of the transformer bank 4 are rotated 120° or 240°. For this purpose, the voltage responsive relay 13 is connected across one phase of the main contacts of the network circuit breaker 5, and is designed to operate at a voltage of the order of 140% of the normal line-to-ground voltage of the secondary circuit of the transformer bank 4. The voltage responsive relay 13 is designed to drop-out at some lower value of voltage above normal value, such as 115% of the normal secondary line-to-ground voltage of the transformer bank 4.

A closing relay 14 is provided for initiating a closing operation of the network circuit breaker 5 when the feeder 3 is energized by voltage of approximately normal value and no cross phase condition of the secondary voltage of the transformer 4 exists, as evidenced by the closed condition of the negative sequence relay 12 and the voltage responsive relay 13. The closing relay 14 is designed to close at a voltage value of the order of 90% of the normal line-to-line secondary voltage of the transformer bank 4, and to drop-out at some lower value such as 70%.

A time delay relay 15 is provided for introducing a sufficient time delay in the closing operation of the network circuit breaker 5 to insure that each network circuit breaker associated with the feeder 3 remains in open condition, after opening, until the remaining network circuit breakers of feeder 3 open so as to insure the complete clearing of the feeder following the opening of the feeder breaker.

The time delay relay 15 is preferably designed to close at a voltage of the order of 85% of the normal line-to-line voltage of the secondary circuit of the transformer bank 4, and to drop-out at some lower value such as 70%. The time delay introduced by this relay may be of the order of .5 to 4 seconds.

The network circuit breaker 5 may be of any suitable type for controlling the comparatively large currents at low voltage which traverse the secondary windings of the transformer bank 4, and is provided with a closing solenoid or motor 16 of any suitable design and the usual trip coil 17.

The operation of the above-described apparatus may be set forth as follows. With the feeder circuit breaker 2 and the network circuit breaker 5 open as shown, the network 6 may be energized from the bus 1 by closing the feeder breaker 2. Upon closure of the feeder breaker 2, the feeder 3 becomes energized with three-phase voltage of normal magnitude and a secondary voltage of normal phase sequence and magnitude appears across the secondary terminals of the transformer bank 4. As the feeder 3 is energized, the under-voltage relay 9 opens its contacts without substantial time delay.

As the phase sequence of secondary voltage of the transformer bank 4 is normal, its negative sequence component is approximately zero, and the negative sequence relay 12 remains closed. The voltage responsive relay 13 is energized by a voltage which may be either of the order of zero volts in the event that the network 6 is energized, or may be of the order of 100% of the normal line-to-ground voltage of the network 6 in the event that the latter is deenergized. In either case, however, the voltage applied to the voltage responsive relay 13 is insufficient to effect opening of the latter.

As the contacts of the negative sequence relay 12 and the voltage responsive relay 13 are closed, the closing relay 14 is subject to approximately normal voltage and the latter relay closes to complete a circuit for the time delay relay 15. As the voltage impressed upon the time delay relay 15 exceeds the 85% value to which the latter responds, the time delay relay 15 operates to closed position at the expiration of its time delay of .5 to 4 seconds.

In response to closure of the time delay relay 15, the closing solenoid 16 is energized to effect closure of the network circuit breaker 5, and the power connection from the station bus 1 to the network 6 is completed.

If a fault occurs on the network 6, the impedance of the transformer banks, such as bank 4, prevents any material reduction of the voltage of the feeder 3 and the under-voltage relay 9 remains in open condition. The fault on the network 6 is burned off in the usual manner.

If a fault occurs on the feeder 3, the feeder breaker 2 opens without substantial time delay and establishes a ground on one of the conductors of the feeder 3 by means of the grounding switch 7. As the feeder circuit is now grounded at only one point, the voltage on the two ungrounded phases rises because of the shift in the voltage delta, and the voltage impressed upon the condenser 10 and under-voltage relay 9 in series falls to approximately zero.

In response to the reduction of voltage applied to the under-voltage relay 9, the latter drops out to close its contacts and complete a circuit for the trip coil 17 of the network circuit breaker 5. The network circuit breaker 5 is, accordingly, opened to interrupt the power connections through the transformer bank 4. The remaining network protectors (not shown) supplied from the feeder 3 operates similarly to interrupt the connections of their associated transformer banks and the entire feeder 3 is accordingly deenergized.

Assuming that the feeder fault did not clear upon deenergization of the feeder 3, and that in repairing the faulted feeder the workmen accidentally transposed one or more phases of the feeder cable 3, upon reclosure of the feeder circuit breaker 2, the voltage impressed upon either the negative sequence relay 12 or the voltage responsive relay 13 would exceed the operating value for the energized relay, depending upon the manner in which the feeder conductors were transposed. In either case, however, the circuit of the closing relay 14 would be interrupted, thereby preventing reclosure of the network circuit breaker 5.

Figure 2:
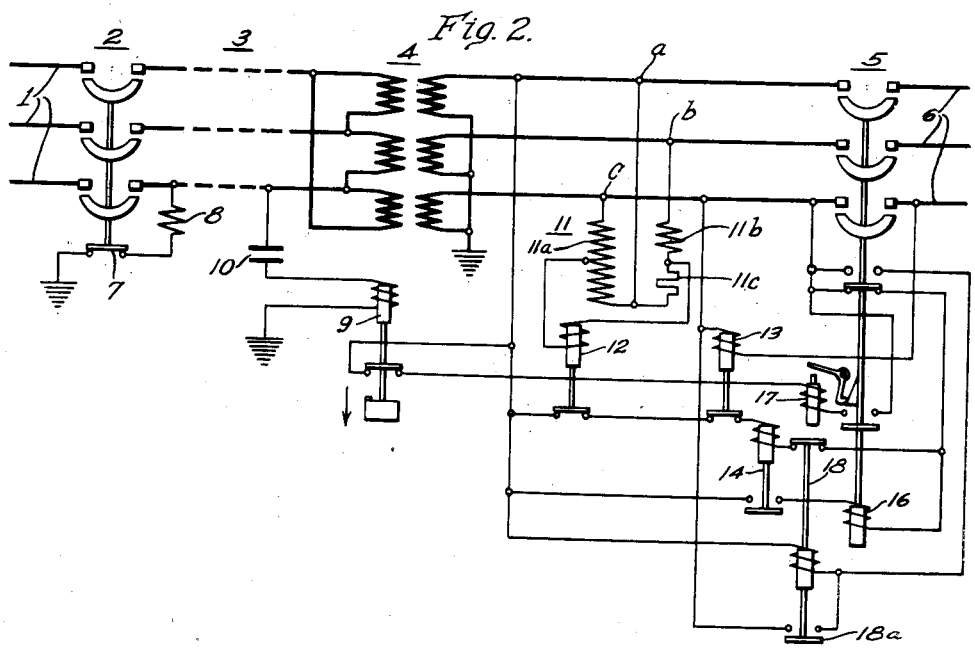
Fig. 2 is a diagrammatic view similar to Fig. 1 of a modified form of the invention.

The network protector disclosed in Fig. 2 is similar to that shown in Fig. 1, except that a lock-out relay 18 is substituted for the time delay relay 15. The lock-out relay 18 is designed to close at a voltage of the order of 70% to 80% line-to-line voltage of the network 6, and to drop-out at a relatively low voltage value such as 20% of the normal line-to-line network voltage. The lock-out relay 18 is provided with contacts 18a for establishing a holding circuit for itself upon its closure and is connected so as to interrupt the circuit of closing relay 14 upon its closure.

The lock-out relay 18 is connected to close upon closure of the network circuit breaker 5, and because of its holding circuit mentioned above, remains closed after the network circuit breaker 5 trips open until the feeder 3 is completely deenergized. In this way reclosure of network protectors is prevented after the feeder breaker 2 has opened until all of the network circuit breakers connected to the feeder have opened to thereby clear the feeder. The operation of the apparatus shown in Fig. 2 will otherwise be clear from that described above in connection with Fig. 1.

Fig. 3 shows a further modification of the invention in which the automatic grounding switch 7 of Figs. 1 and 2 is replaced by a manually operated grounding switch 7a. In the Fig. 3 modification, two of the transformers 4 are provided with auxiliary windings 20 connected in open delta to three under-voltage relays 21, which latter relays are designed to close their contacts upon a reduction of any phase-to-phase voltage of the feeder 3 to a value of the order of 30% normal after a slight time delay. These relays pick-up to open their contacts at a phase-to-phase voltage of approximately 80% normal.

A voltage relay 19 which is provided with front contacts, as well as back contacts, is substituted for the under-voltage relay 9 of Figs. 1 and 2.

The voltage responsive relay 19 is designed to close its front contacts at a voltage of the order of 140% of the normal line-to-ground voltage of the feeder 3, and to close its back contacts at a voltage of the order of 30% of normal line-to-ground feeder voltage. This relay is also designed to introduce a time delay of the order of .5 to 1 second, which time delay is approximately the same as that of the under-voltage relays 21. However, the voltage responsive relay 19 is delayed in both directions of operation, whereas the under-voltage relays 21 are delayed only in the contact closing direction. It will be understood that the arrows shown adjacent the various time delay relays indicate the direction of delay.

In the Fig. 3 modification, the voltage responsive relay 19 operates to close either its front or back contacts in the event of any ground upon the feeder 3, depending upon which phase of the feeder is grounded, and the under-voltage relays 21 operate in thte event of any phase-to-phase fault of the feeder 3. The relays 19 and 21 together, accordingly, provide protection against all faults on the feeder 3, and it is unnecessary to provide automatic apparatus for grounding the feeder 3 when the feeder circuit breaker 2 opens. In this modification, the manually operated grounding switch 7a may be closed to effect opening of all of the network protectors when the feeder breaker 2 is open and no fault condition exists on the feeder 3.

Although I have shown in Fig. 1, a separate closing relay 14 and time delay relay 15 for controlling the closure of the network circuit breaker 5, it will be obvious that the functions of these two relays may be combined in a single relay if desired.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In an alternating-current network system of distribution, a three-phase alternating-current network circuit; a three-phase alternating-current feeder circuit; a plurality of transformer means for supplying power from said feeder circuit to said network circuit; a plurality of network circuit breakers for controlling the power flow through said transformer means; individual closing means for said network circuit breakers; and individual phasing means for controlling said closing means, each of said phasing means comprising a negative phase sequence voltage filter for segregating a negative sequence component of voltage of said feeder circuit, means responsive to the negative sequence voltage segrgegated by said filter for preventing operation of the associated closing means, and means responsive to an excess voltage condition between a secondary conductor of the associated transformer means and a corresponding phase conductor of said network circuit for preventing operation of the associated closing means.

2. In an alternating-current network system of distribution, a three-phase, four-wire alternating-current network circuit; a three-phase alternating-current feeder circuit; a plurality of transformer means for supplying power from said feeder circuit to said network circuit; a plurality of network circuit breakers for controlling the power flow through said transformer means; individual closing means for said network circuit breakers; and individual phasing means for controlling said closing means, each of said phasing means comprising a negative phase sequence voltage filter for segregating a negative sequence component of voltage of said feeder circuit, means responsive to the negative sequence voltage segregated by said filter for preventing operation of the associated closing means, and means responsive to an excess voltage condition between a secondary conductor of the associated transformer means and a corresponding phase conductor of said network circuit for preventing operation of the associated closing means, said excess voltage condition being of the order of 140% of the normal line-to-neutral voltage of said network circuit.

3. In an alternating-current network system of distribution, a three-phase alternating-current network circuit; a three-phase alternating-current feeder circuit; a plurality of transformer means for supplying power from said feeder circuit to said network circuit; a plurality of network circuit breakers for controlling the power flow through said transformer means; individual opening means for said network circuit breakers, each of said opening means being effective in response to a fault on said feeder circuit to cause opening of the associated network circuit breaker without substantial time delay; individual closing means for said network circuit breakers, each of said closing means being effective in response to a predetermined energized condition of said feeder circuit to cause closure of the associated network circuit after a time delay sufficient to permit the remainder of said network circuit breakers to open following a fault on saidf eeder circuit; and individual phasing means for controlling said closing means, each of said phasing means comprising a negative phase sequence voltage filter for segregating a negative sequence component of voltage of said feeder circuit, means responsive to the negative sequence voltage segregated by said filter for preventing operation of the associated closing means, and means responsive to an excess voltage condition between a secondary conductor of the associated transformer means and a corresponding phase conductor of said network circuit for preventing operation of the associated closing means.

4. In an alternating-current network system of distribution, a three-phase, four-wire alternating-current network circuit; a three-phase alternating-current feeder circuit; a plurality of transformer means for supplying power from said feeder circuit to said network circuit; a plurality of network circuit breakers for controlling the power flow through said transformer means; individual opening means for said network circuit breakers, each of said opening means being effective in response to a fault on said feeder circuit to cause opening of the associated network circuit breaker without substantial time delay; individual closing means for said network circuit breakers, each of said closing means being effective in response to a predetermined energized condition of said feeder circuit to cause closure of the associated network circuit breaker after a time delay sufficient to permit the remainder of said network circuit breakers to open following a fault on said feeder circuit; and individual phasing means for controlling said closing means, each of said phasing means comprising a negative phase sequence voltage filter for segregating a negative sequence component of voltage of said feeder circuit, means responsive to the negative sequence voltage segregated by said filter for preventing operation of the associated closing means, and means responsive to an excess voltage condition between a secondary conductor of the associated transformer means and a corresponding phase conductor of said network circuit for preventing operation of the associated closing means, said excess voltage condition being of the order of 140% of the normal line-to-neutral voltage of said network circuit.

5. In an alternating-current network system of distribution, a three-phase alternating-current network circuit; a three-phase alternating-current feeder circuit; a plurality of transformer means for supplying power from said feeder circuit to said network circuit; a plurality of network circuit breakers for controlling the power flow through said transformer means; individual closing means for said network circuit breakers, each of said closing means being responsive to a predetermined voltage condition of said feeder circuit; lockout means for preventing operation of said closing means after energization of said feeder circuit until said feeder circuit is completely deenergized; and individual phasing means for controlling said closing means, each of said phasing means comprising means responsive to reversed sequence of the phase voltages of said feeder circuit for preventing operation of the associated closing means, and means responsive to an excess voltage condition between a secondary conductor of the associated transformer means and a corresponding phase conductor of said network circuit for preventing operation of the associated closing means.

6. In an alternating-current network system of distribution, a three-phase, four-wire alternating-current network circuit; a three-phase alternating-current feeder circuit; a plurality of transformer means for supplying power from said feeder circuit to said network circuit; a plurality of network circuit breakers for controlling the power flow through said transformer means; individual closing means for said network circuit breakers, each of said closing means being responsive to a predetermined voltage condition of said feeder circuit; lockout means for preventing operation of said closing means after energization of said feeder circuit until said feeder circuit is completely deenergized; and individual phasing means for controlling said closing means, each of said phasing means comprising a negative phase sequence voltage filter for segregating a negative sequence component of voltage of said feeder circuit, means responsive to the negative sequence voltage segregated by said filter for preventing operation of the associated closing means, and means responsive to an excess voltage condition between a secondary conductor of the associated transformer means and a corresponding phase conductor of said network circuit for preventing operation of the associated closing means, said excess voltage condition being of the order of 140% of the normal line-to-neutral voltage of said network circuit.

7. In an alternating-current system of transmission and distribution, a pair of polyphase alternating-current circuits to be connected when energized by polyphase voltages of similar magnitude and phase position, a circuit breaker for connecting said circuits, means for closing said circuit breaker, means for deriving from one of said circuits a control voltage dependent upon the negative phase sequence voltage of one of said circuits, and means responsive to said control voltage for preventing operation of said closing means.

8. In an alternating-current system of distribution, a three-phase alternating-current network circuit, a three-phase alternating-current feeder circuit, a circuit breaker for connecting said circuits, closing means for said circuit breaker, a negative sequence voltage filter operatively connected for energization from said feeder circuit, and means responsive to the output of said filter for preventing closure of said circuit breaker.

9. In an alternating-current system of transmission and distribution, a pair of polyphase alternating-current circuits to be connected when energized by polyphase voltages of similar magnitude and phase position, a circuit breaker for connecting said circuits, means for closing said circuit breaker, means for deriving from one of said circuits a control voltage dependent upon the negative phase sequence voltage of one of said circuits, means responsive to said control voltage for preventing operation of said closing means, and means responsive to an excess voltage condition between a phase conductor of a first one of said circuits and a corresponding phase conductor of a second one of said circuits for preventing operation of said closing means.

10. In an alternating-current system of distribution, a three-phase alternating-current network circuit, a three-phase alternating-current feeder circuit, a circuit breaker for connecting said circuits, closing means for said circuit breaker, a negative sequence voltage filter operatively connected for energization from said feeder circuit, means responsive to the output of said filter for preventing closure of said circuit breaker, and means responsive to an excess voltage condition between a phase conductor of said network circuit and a corresponding phase conductor of said feeder circuit for preventing closure of said circuit breaker.

JOHN S. PARSONS.